United States Patent [19]
Washino

[11] Patent Number: 5,999,220
[45] Date of Patent: Dec. 7, 1999

[54] MULTI-FORMAT AUDIO/VIDEO PRODUCTION SYSTEM WITH FRAME-RATE CONVERSION

[76] Inventor: Kinya Washino, 750 Huyler St., Peterborough, N.J. 07608

[21] Appl. No.: 08/834,912

[22] Filed: Apr. 7, 1997

[51] Int. Cl.⁶ .............................. H04N 5/46; H04N 7/01
[52] U.S. Cl. .................... 348/441; 348/722; 348/445; 348/555; 348/556
[58] Field of Search .................... 348/441, 445, 348/448, 426, 432, 454, 558, 568, 555–556, 722, 911, 575; 358/527, 524; H04N 5/46, 7/01, 5/262, 5/253

[56] References Cited

U.S. PATENT DOCUMENTS

| | | | |
|---|---|---|---|
| 4,633,293 | 12/1986 | Powers | 348/441 |
| 5,045,932 | 9/1991 | Sharman et al. | 358/527 |
| 5,243,433 | 9/1993 | Hailey | 348/445 |
| 5,327,235 | 7/1994 | Richards | 348/441 |
| 5,331,346 | 7/1994 | Shields et al. | 348/441 |
| 5,384,598 | 1/1995 | Rodriguez et al. | 348/441 |
| 5,444,491 | 8/1995 | Lim | 348/441 |
| 5,519,438 | 5/1996 | Elliott et al. | 348/441 |
| 5,532,749 | 7/1996 | Hong | 348/441 |
| 5,537,157 | 7/1996 | Washino et al. | 348/722 |
| 5,600,377 | 2/1997 | David et al. | 348/441 |
| 5,608,464 | 3/1997 | Woodham | 348/441 |
| 5,617,218 | 4/1997 | Rhodes | 348/441 |
| 5,701,383 | 12/1997 | Russo et al. | 386/46 |
| 5,724,101 | 3/1998 | Haskin | 348/441 |
| 5,754,248 | 5/1998 | Faroudja | 348/441 |
| 5,771,073 | 6/1998 | Lim | 348/441 |
| 5,812,204 | 9/1998 | Baker et al. | 348/441 |
| 5,832,085 | 11/1998 | Inoue et al. | 348/441 |
| 5,835,150 | 11/1998 | Choi | 348/441 |
| 5,838,381 | 11/1998 | Kasahara et al. | 348/441 |

FOREIGN PATENT DOCUMENTS

| | | | |
|---|---|---|---|
| 314873 | 5/1989 | European Pat. Off. | H04N 5/46 |
| 514012 | 11/1992 | European Pat. Off. | H04N 7/01 |
| WO93/15586 | 8/1993 | WIPO | H04N 7/01 |

OTHER PUBLICATIONS

G. Demos, "An Example of Hierarchy of Formats for HDTV," SMPTE Journal, Sep. 1992, pp. 609–617.
J.S. Lim, "A Proposal for an HDTV/ATV Standard with Multiple Transmission Formats," SMPTE Journal, Aug. 1993, pp. 699–702.
W.E. Bretl, "3SNTSC–A 'Leapfrog' Production Standard for HDTV," SMPTE Journal, Mar. 1989, pp. 173–178.
B. Hunt, G. Kennel, L. DeMarsh, S. Kristy, "High–Resolution Electronic Intermediate System for Motion–Picture Film," SMPTE Journal, Mar. 1991, pp. 156–161.

(List continued on next page.)

*Primary Examiner*—Vu Le
*Attorney, Agent, or Firm*—Gifford, Krass, Groh, Sprinkle, Anderson & Citkowski, PC

[57] ABSTRACT

An audio/video production system facilitates professional quality image manipulation and editing. A program input may be translated into any of a variety of graphics or television formats, including NTSC, PAL, SECAM and HDTV, and stored as data-compressed images, using any of several commercially available methods such as Motion JPEG, MPEG, etc. While being processed, the images may be re-sized to produce a desired aspect ratio or dimensions using conventional techniques such as pixel interpolation, and signals within the video data stream optionally may be utilized to control "pan/scan" operations at a receiving video display unit, in case this unit does not have the same aspect ratio as the source signal. Other information may be utilized to restrict playback of the program material based on predetermined regional or geographical criteria. Frame rate conversion to and from conventional formats is performed by using the prevailing techniques employed for film-to-NTSC and film-to-PAL transfers, or by inter-frame interpolation, all well known in the art, or by reproduction of the program at a selected non-standard frame rate, optionally combined with these prevailing techniques. By judicious selection of the optimal digitizing parameters, the system allows a user to establish an inter-related family of aspect ratios, resolutions, and frame rates, yet remain compatible with currently available and planned graphics and television formats.

27 Claims, 9 Drawing Sheets

OTHER PUBLICATIONS

A. Kaiser, H. Mahler, R., McMann, "Resolution Requirements for HDTV Based Upon the Performance of 35mm Motion–Picture Films for Theatrical Viewing," SMPTE Journal, Jun. 1985, pp. 654–659.

Y. Ide, M. Sasuga, N. Harada, T. Nishizawa, "A Three–CCD HDTV Color Camera," SMPTE Journal, Jul. 1990, pp. 532–537.

G. Reitmeier, C. Carlson, E. Geiger, D. Westerkamp, "The Digital Hierarchy—A Blueprint for Television in the 21st Century," SMPTE Journal, Jul. 1992, pp. 466–470.

L. Thorpe, T. Hanabusa, "If Progressive Scanning is So Good, How Bad is Interlace?", SMPTE Journal, Dec. 1990, p. 972–86.

| SOURCE \ OUTPUT | 24 | 25 | 30 |
|---|---|---|---|
| 24 | X | SPEED-UP | 3:2 PULL-DOWN |
| 25 | SLOW-DOWN | X | SLOW-DOWN & 3:2 PULL-DOWN |
| 30 | 2:3 PULL-DOWN | 2:3 PULL-DOWN & SPEED-UP | X |

Figure - 8

MULTI-FORMAT AUDIO/VIDEO PRODUCTION SYSTEM WITH FRAME-RATE CONVERSION

FIELD OF THE INVENTION

This invention relates generally to video production, photographic image processing, and computer graphics design, and, more particularly, to a multi-format video production system capable of professional quality editing and manipulation of images intended for television and other applications, including HDTV programs.

BACKGROUND OF THE INVENTION

As the number of television channels available through various program delivery methods (cable TV, home video, broadcast, etc.) continues to proliferate, the demand for programming, particularly high-quality HDTV-format programming, presents special challenges, both technical and financial, to program producers. While the price of professional editing and image manipulation equipment continues to increase, due to the high cost of research and development and other factors, general-purpose hardware, including personal computers, can produce remarkable effects at a cost well within the reach of non-professionals, even novices. As a result, the distinction between these two classifications of equipment has become less well defined. Although general-purpose PC-based equipment may never allow professional-style rendering of images at full resolution in real-time, each new generation of microprocessors enables progressively faster, higher-resolution applications. In addition, as the price of memory circuits and other data storage hardware continues to fall, the capacity of such devices has risen dramatically, thereby improving the prospects for enhancing PC-based image manipulation systems for such applications.

In terms of dedicated equipment, attention has traditionally focused on the development of two kinds of professional image-manipulation systems: those intended for the highest quality levels to support film effects, and those intended for television broadcast to provide "full 35 mm theatrical film quality," within the realities and economics of present broadcasting systems. Conventional thinking holds that 35 mm theatrical film quality as projected in theaters is equivalent to 1200 or more lines of resolution, whereas camera negatives present 2500 or more lines. As a result, image formats under consideration have been directed towards video systems having 2500 or more scan lines for high-level production, with hierarchies of production, HDTV broadcast, and NTSC and PAL compatible standards which are derived by down-converting these formats. Most proposals employ progressive scanning, although interlace is considered an acceptable alternative as part of an evolutionary process. Another important issue is adaptability to computer-graphics-compatible formats.

Current technology directions in computers and image processing should allow production equipment based upon fewer than 1200 scan lines, with picture expansions to create a hierarchy of upward-converted formats for theatrical projection, film effects, and film recording. In addition, general-purpose hardware enhancements should be capable of addressing the economic aspects of production, a subject not considered in detail by any of the available references.

SUMMARY OF THE INVENTION

The present invention takes advantage of general-purpose hardware where possible to provide an economical multi-format video production system. In the preferred embodiment, specialized graphics processing capabilities are included in a high-performance personal computer or workstation, enabling the user to edit and manipulate an input video program and produce an output version of the program in a final format which may have a different frame rate, pixel dimensions, or both. An internal production format is chosen which provides the greatest compatibility with existing and planned formats associated with standard and widescreen television, high-definition television, and film. For compatibility with film, the frame rate of the internal production format is preferably 24 fps. Images are re-sized by the system to larger or smaller dimensions so as to fill the particular needs of individual applications, and frame rates are adapted by inter-frame interpolation or by traditional schemes, including "3:2 pull-down" for 24-to-30 fps conversions; simple speed-up (for 24-to-25 conversions) or slow-down (for 25-to-24 conversions) of playback-; or by manipulating the frame rate itself using a program storage facility with asynchronous reading and writing capabilities.

The invention comprises a plurality of interface units, including a standard/widescreen interface unit operative to convert the video program in the input format into an output signal representative of a standard/widescreen formatted image, and output the signal to an attached display device. A high-definition television interface unit is operative to convert the video program in the input format into an output signal representative of an HDTV-formatted image, and output the signal to the display device. A centralized controller in operative communication with the video program input, the graphics processor, and an operator interface, enables commands entered by an operator to cause the graphics processor to perform one or more of the conversions using the television interfaces. The present invention thus encourages production at relatively low pixel dimensions to make use of lower-cost general-purpose hardware and to maintain high signal-to-noise, then subsequently expands the result into a higher-format final program. This is in contrast to competing approaches, which recommend operating at higher resolution, then down-sizing, if necessary, to less expensive formats, which has led to the expensive dedicated hardware, the need for which the present invention seeks to eliminate. In addition, the flexible storage and playback facilities allow extensive control of the playback of the program material, enabling frame rate adjustments and alterations, and providing for time-shifting of the start and end points of the program reproduction in those cases wherein direct control of the source material frame rate is not practical, due to physical separation of the equipment or multiple reception points simultaneously producing outputs at different frame rates from the same source signal playback data stream. In commercial implementations, the invention readily accepts and processes enhanced information, such as pan/scan information or identification information to restrict viewing based on regional or geographical marketing plans.

DETAILED DESCRIPTION OF THE PREFERRED EMBODIMENT

The present invention is primarily concerned with the conversion of disparate graphics or television formats, including requisite frame-rate conversions, to establish an inter-related family of aspect ratios, resolutions, and frame rates, while remaining compatible with available and future graphics/TV formats. These formats include images of pixel dimensions capable of being displayed on currently available multi-scan computer monitors, and custom hardware will be described whereby frames of higher pixel-count beyond the capabilities of these monitors may be viewed. Images are re-sized by the system to larger or smaller dimensions so as to fill the particular needs of individual applications, and frame rates are adapted by inter-frame interpolation or by traditional schemes such as using "3:2 pull-down" (for 24 to 30 frame-per-second film-to-NTSC conversions) or by speeding up the frame rate itself (as for 24 to 25 fps for PAL television display). The re-sizing operations may involve preservation of the image aspect ratio, or may change the aspect ratio by "cropping" certain areas, by performing non-linear transformations, such as "squeezing" the picture, or by changing the vision center for "panning," "scanning" and so forth. Inasmuch as film is often referred to as "the universal format," (primarily because 35-mm film equipment is standardized and used throughout the world), the preferred internal or "production" frame rate is preferably 24 fps. This selection also has an additional benefit, in that the 24 fps rate allows the implementation of cameras having greater sensitivity than at 30 fps, which is even more critical in systems using progressive scanning (for which the rate will be 48 fields per second vs. 60 fields per second in some other proposed systems).

The image dimensions chosen allow the use of conventional CCD-type cameras, but the use of digital processing directly through the entire signal chain is preferred, and this is implemented by replacing the typical analog RGB processing circuitry with fully digital circuitry. Production effects may be conducted in whatever image size is appropriate, and then re-sized for recording. Images are recorded by writing the digital data to storage devices employing removable hard-disk drives, disk drives with removable media, optical or magneto-optical based drives, tape-based drives, or semiconductor-based memory devices, preferably in compressed-data form. As data rates for image processing and reading-from- or writing-to- disk drives increase, many processes that currently require several seconds will soon become attainable in real-time; this will eliminate the need to record film or video frames at slower rates. Other production effects, such as slow-motion or fast-motion may be incorporated, and it is only the frame-processing-rate of these effects that is limited in any way by the technology of the day. In particular, techniques such as non-linear-editing, animation, and special-effects will benefit from the implementation of this system. In terms of audio, the data rate requirements are largely a function of sound quality. The audio signals may be handled separately, as in an "interlocked" or synchronized system for production, or the audio data may be interleaved within the video data stream. The method selected will depend on the type of production manipulations desired, and by the limitations of the current technology.

Figure 1A:
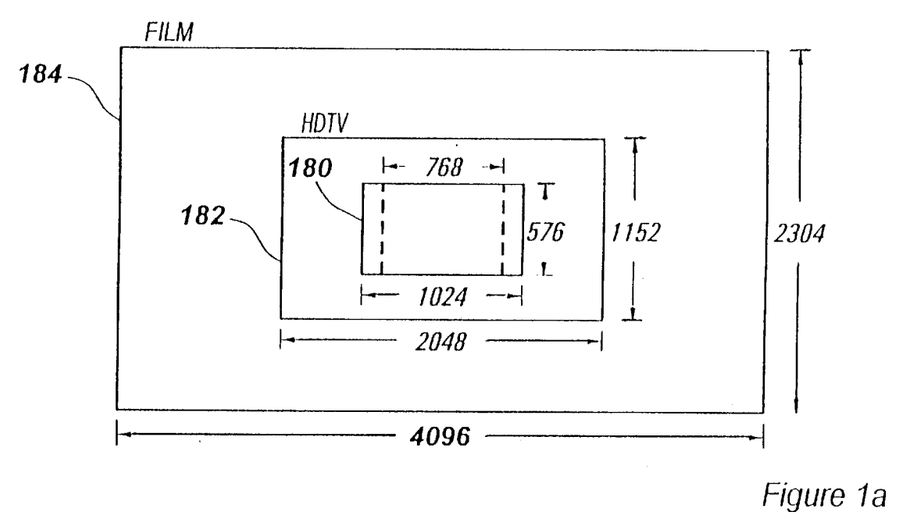
FIGS. 1A–1D show the preferred and alternative image aspect ratios in pixels.

Although a wide variety of video formats and apparatus configurations are applicable to the present invention, the system will be described in terms of the alternatives most compatible with currently available equipment and methods. FIG. 1A illustrates one example of a compatible system of image sizes and pixel dimensions. The selected frame rate is preferably 24 per second (2:1 interlaced), for compatibility with film elements; the selected picture dimension in pixels is preferably 1024×576 (0.5625 Mpxl), for compatibility with the 16:9 "wide-screen" aspect ratio anticipated for HDTV systems, and the conventional 4:3 aspect ratio used for PAL systems [768×576 (0.421875 Mpxl)]. All implementations preferably rely on square pixels, though other pixel shapes may be used. Re-sizing (using the well known, sophisticated sampling techniques available in many image-manipulation software packages or, alternatively, using hardware circuitry described herein below) to 2048×1152 (2.25 Mpxl) provides an image suitable for HDTV displays or even theatrical projection systems, and a further re-sizing to 4096×2304 (9.0 Mpxl) is appropriate for even the most demanding production effects. Images may be data compressed 5:1 for 16:9 "wide-screen" TV frames, or 10:1 for HDTV; the data files may then be stored on conventional disk drives, requiring only approximately 8.1 MB/sec for wide-screen frames in RGB, and only 16.1 MB/sec for HDTV frames in RGB.

Figure 1B:
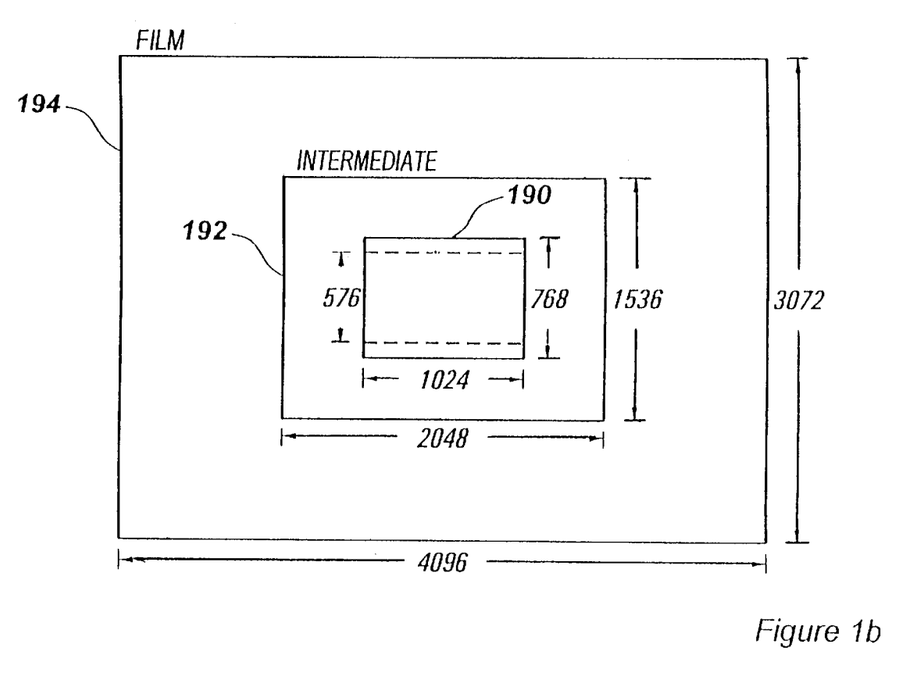

An alternative embodiment of the invention is shown in FIG. 1B. In this case, the user would follow a technique commonly used in film production, in which the film is exposed as a 4:3 aspect ratio image. When projected as a wide-screen format image, the upper and lower areas of the frame may be blocked by an aperture plate, so that the image shows the desired aspect ratio (typically 1.85:1 or 1.66:1). If the original image format were recorded at 24 frames per second, with a 4:3 ratio and with a dimension in pixels of 1024×768, all image manipulations would preserve these dimensions. Complete compatibility with the existing formats would result, with NTSC and PAL images produced directly from these images by re-scaling, and the aforementioned wide-screen images would be provided by excluding 96 rows of pixels from the top of the image and 96 rows of pixels from the bottom of the image, resulting in the 1024×576 image size as disclosed above. The data content of each of these frames would be 0.75 Mpxls, and the data storage requirements disclosed above would be affected accordingly.

Figure 1C:
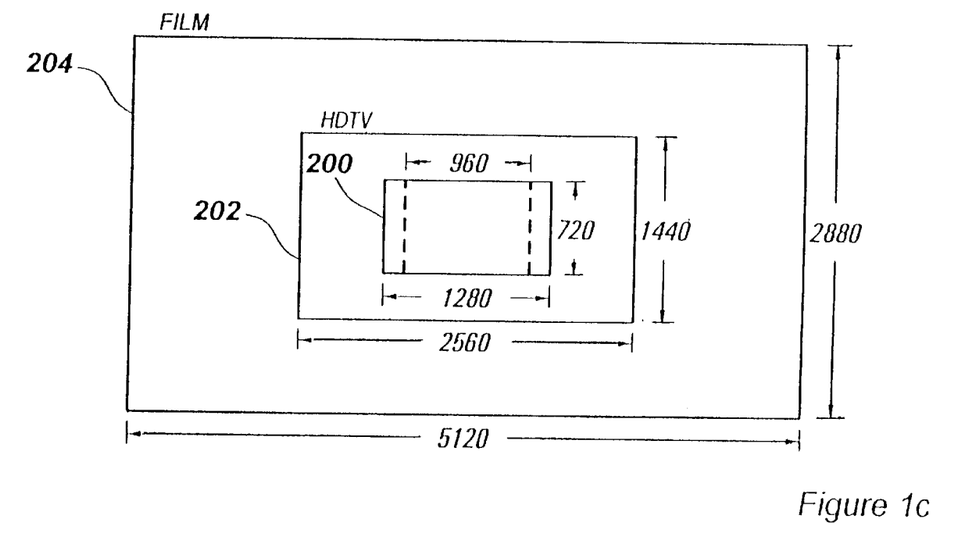

Another embodiment of the invention is depicted in FIG. 1C. In this alternative, the system would follow the image dimensions suggested in several proposed digital HDTV formats under consideration by the Advanced Television Study Committee of the Federal Communications Commission. The format to be adopted is expected to assume a wide-screen image having dimensions of 1280×720 pixels. Using these image dimensions (but at 24 fps with 2:1 interlace), compatibility with the existing formats would be available, with NTSC and PAL images derived from this frame size by excluding 160 columns of pixels from each side of the image, thereby resulting in an image having a dimension in pixels of 960×720. This new image would then be re-scaled to produce images having pixel dimensions of 640×480 for NTSC, or 768×576 for PAL; the corresponding wide-screen formats would be 854×480 and 1024×576, respectively. In this case, an image having a dimension in pixels of 1280×720 would contain 0.87890625 Mpxl, with 1,000 TV lines of resolution; furthermore, the systems under evaluation by the ATSC of the FCC also assume a decimation of the two chrominance signals, with detail of only 640×360 pixels retained. The data storage requirements disclosed above would be affected accordingly. The development path to 24 fps with progressive scanning is both well-defined and practical, as is the use of the previously described methods to produce images having a dimension in pixels of 2048×1152.

Figure 1D:
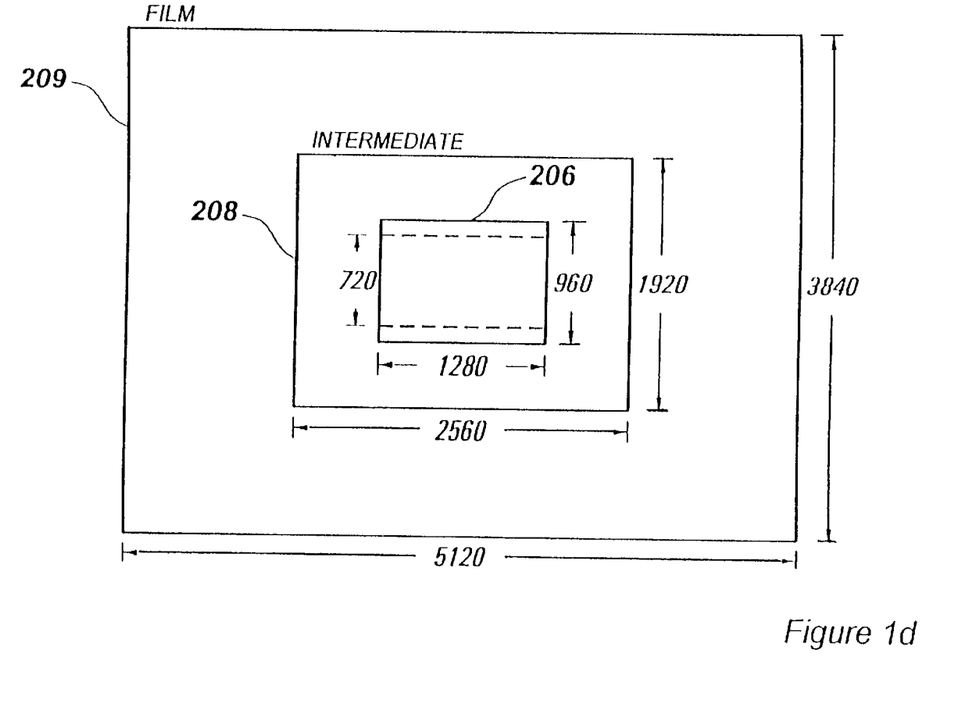

A further alternative embodiment of the invention is shown in FIG. 1D. As with the system described with reference to FIG. 1B, the user follows the technique commonly used in film production, wherein the film is exposed as a 4:3 aspect ratio image. When projected as a wide-screen format image, the upper and lower areas of the frame area again blocked by an aperture plate, so that the image shows the desired aspect ratio (typically 1.85:1 or 1.66:1). For an original image format recorded at 24 frames per second, with 4:3 ratio and with pixel dimensions of 1280×960, all image manipulations preserve these dimensions. Complete compatibility with the existing formats results, with NTSC and PAL images produced directly from these images by resealing, and the aforementioned wide-screen images are provided by excluding 120 rows of pixels from the top of the image and 120 rows of pixels from the bottom of the image, thereby resulting in the 1280×720 image size as described above. The data content of each of these frames is 0.87890625 Mpxls, and the data storage requirements disclosed above are affected accordingly.

In each of the cases described herein above, a positioning or image centering signal may be included within the data stream, so as to allow the inclusion of information which may be utilized by the receiving unit or display monitor to perform a "pan/scan" operation, and thereby to optimize the display of a signal having a different aspect ratio than that of the display unit. For example, a program transmitted in a wide-screen forma would include information indicating the changing position of the image center, so that a conventional (4:3 aspect ratio) display unit would automatically pan to the proper location. For the display of the credits or special panoramic views, the monitor optionally could be switched to a full "letter-box" display, or the image could be centered and rescaled to include information corresponding to an intermediate situation, such as halfway between full-height (with cropped sides) and letter-box (full-width, but with blank spaces above and below the image on the display). This positioning/rescaling information would be determined under operator control (as is typical for pan/scan operations when performing film transfers to video) so as to maintain the artistic values of the original material, within the limitations of the intended display format.

Conventional CCD-element cameras produce images of over 800 TV Lines horizontal Luminance (Y) resolution, with a sensitivity of 2,000 lux at f8, and with a signal-to-noise ratio of 62 dB. However, typical HDTV cameras, at 1,000 TV Lines resolution and with similar sensitivity, produce an image with only a 54 dB signal-to-noise ratio, due to the constraints of the wideband analog amplifiers and the smaller physical size of the CCD-pixel-elements. By employing the more conventional CCD-elements in the camera systems of this invention, and by relying upon the computer to create the HDTV-type image by image re-sizing, the improved signal-to-noise ratio is retained. In the practical implementation of cameras conforming to this new design approach, there will be less of a need for extensive lighting provisions, which in turn, means less demand upon the power generators in remote productions, and for AC-power in studio applications.

In CCD-based cameras, it is also a common technique to increase the apparent resolution by mounting the red and blue CCD-elements in registration, but offsetting the green CCD-element by one-half pixel width horizontally. In this case, picture information is in-phase, but spurious information due to aliasing is out-of-phase. When the three color signals are mixed, the picture information is intact, but most of the alias information will be canceled out. This technique will evidently be less effective when objects are of solid colors, so it is still the usual practice to include low-pass optical filters mounted on each CCD-element to suppress the alias information. In addition, this technique cannot be applied to computer-based graphics, in which the pixel images for each color are always in registration. However, in general-use video, the result of the application of this spatial-shift offset is to raise the apparent Luminance (Y) horizontal resolution to approximately 800 television lines.

The availability of hard-disk drives of progressively higher capacity and data transmission rates is allowing successively longer program duration and higher resolution image displays in real-time. At the previously cited data rates, wide-screen frames would require 486 MB/min, so that currently available 10 GB disk drives will store more than 21 minutes of video. When the anticipated 100 GB disk drives (2.5-inch or 3.5-inch disks using Co—Cr, barium ferrite, or other high-density recording magnetic materials) become available, these units will store 210 minutes, or 3 ½ hours of video. For this application, a data storage unit is provided to facilitate editing and production activities, and it is anticipated that these units would be employed in much the same way as video cassettes are currently used in Betacam and other electronic news gathering (ENG) cameras and in video productions. This data storage unit may be implemented by use of a magnetic, optical, or magneto-optical disk drive with removable storage media, by a removable disk-drive unit, such as those based on the PCMCIA standards, or by semiconductor-based memory. Although PCMCIA media are 1.8-inches in dimension, alternative removable media storage units are not restricted to this limit, and could employ larger media, such as 2.5-inch or 3.5-inch disks; this, in turn, will lead to longer duration program data storage, or alternatively this storage capacity could be applied to lower ratios of data compression or higher-pixel-count images, within the limits of the same size media.

Figure 2:
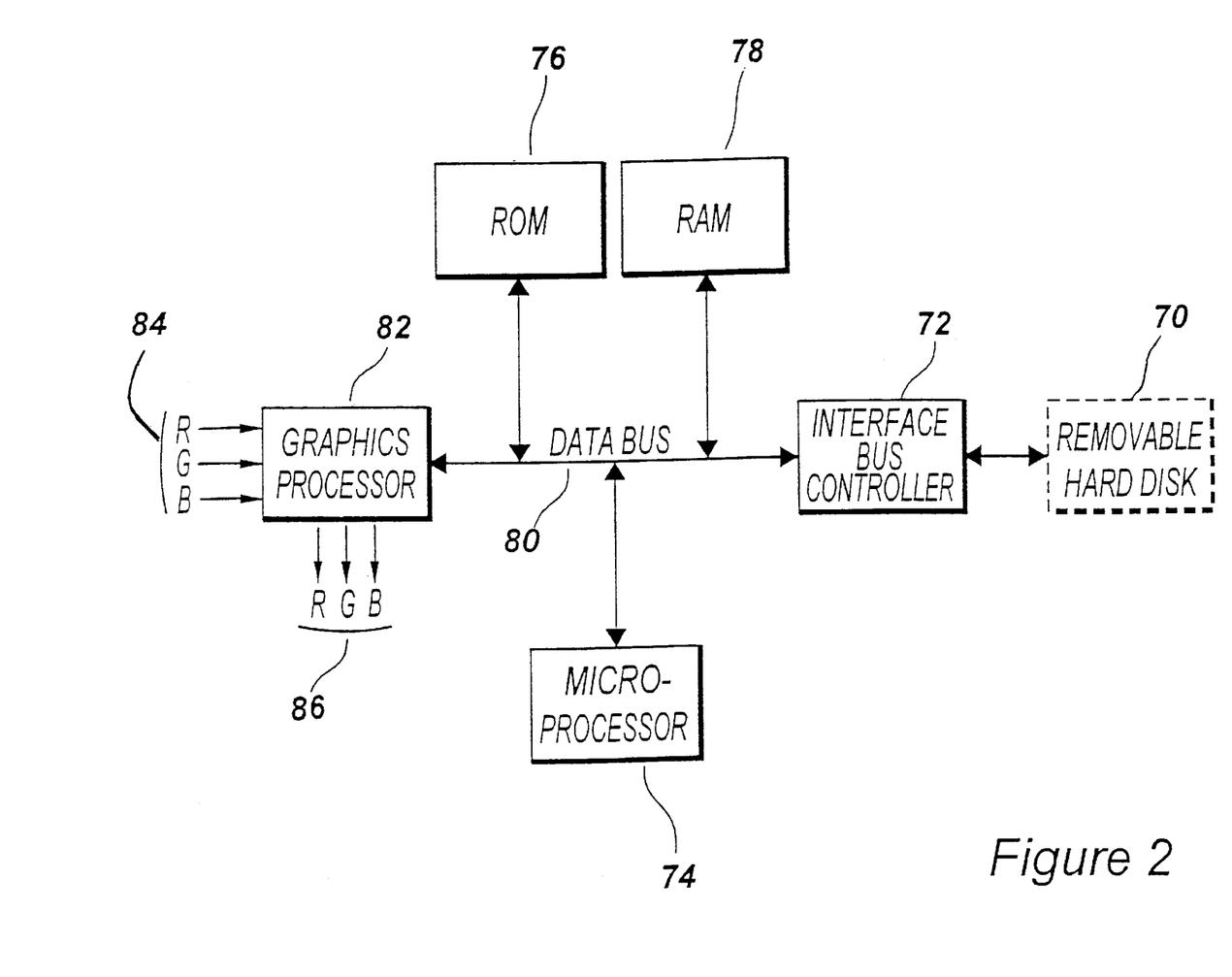
FIG. 2 shows a functional diagram for disk-based video recording.

FIG. 2 shows the functional diagram for the storage-device-based digital recorder employed in the video camera, or separately in editing and production facilities. As shown, a removable hard disk drive 70 is interfaced through a bus controller 72; in practice, alternative methods of storage such as optical or magneto-optical drives could be used, based on various interface bus standards such as SCSI-2 or PCMCIA. This disk drive system currently achieves data transfer rates of 20 MB/sec, and higher rates on these or other data storage devices, such as high-capacity removable memory modules, is anticipated. The microprocessor 74 controls the 64-bit or wider data bus 80, which integrates the various components. Currently available microprocessors include the Alpha 21064 by Digital Equipment Corporation, or the MIPS R4400 by MIPS Technologies, Inc.; future implementations would rely on the P6 by Intel Corp. or the PowerPC 620, which is capable of sustained data transfer rates of 100 MB/sec. Up to 256 MB of ROM, shown at 76, is anticipated for operation, as is 256 MB or more of RAM, shown at 78. Current PC-based video production systems are equipped with at least 64 MB of RAM, to allow sophisticated editing effects. The graphics processor 82 represents dedicated hardware that performs the various manipulations required to process the input video signals 84 and the output video signals 86; although shown using an RGB format, either the inputs or outputs could be configured in alternative signal formats, such as Y/R-Y/B-Y, YIQ, YUV or other commonly used alternatives. In particular, while a software-based implementation of the processor 82 is possible, a hardware-based implementation is preferred, with the system employing a compression ratio of 5:1 for the conventional/widescreen signals ("NTSC/PAL/Widescreen"), and a 10:1 compression ratio for HDTV signals (2048×1152, as described herein above). An example of one of the many available options for this data compression is the currently available Motion-JPEG system. Image re-sizing alternatively may be performed by dedicated microprocessors, such as the gm865X1 or gm833X3 by Genesis Microchip, Inc. Audio signals may be included within the data stream, as proposed in the several systems for digital television transmission already under evaluation by the Federal Communications Commission, or by one of the methods available for integrating audio and video signals used in multi-media recording schemes, such as the Microsoft "AVI" (Audio/Video Interleave) file format. As an alternative, an independent system for recording audio signals may be implemented, either by employing separate digital recording provisions controlled by the same system and electronics, or by implementing completely separate equipment external to the camera system described herein above.

Figure 3:
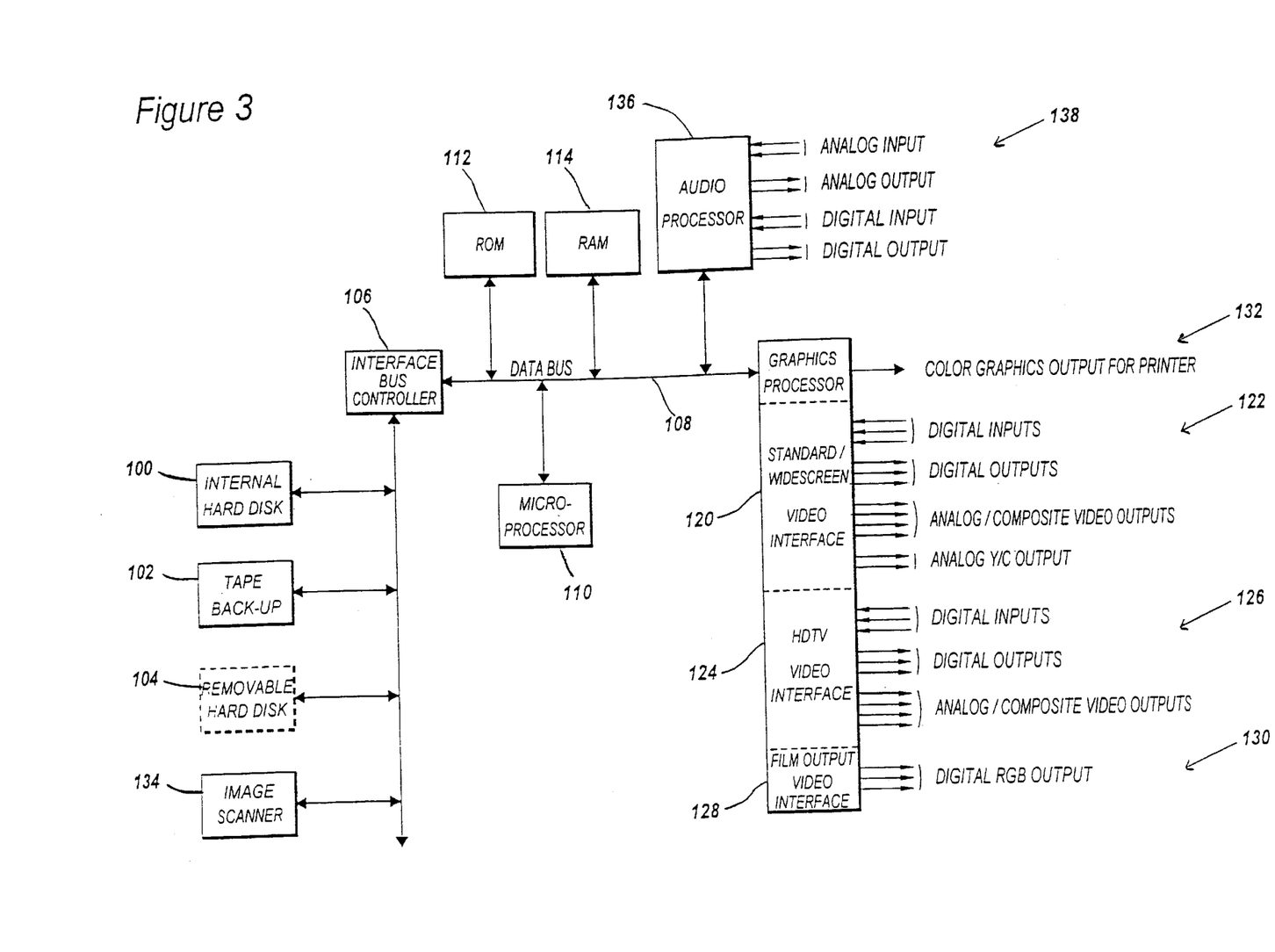
FIG. 3 shows the components comprising the multi-format audio/video production system.

FIG. 3 shows the components that comprise a multi-format audio/video production system. As in the case of the computer disk-based recording system of FIG. 2, an interface bus controller 106 provides access to a variety of storage devices, preferably including an internal hard-disk drive 100, a tape-back-up drive 102, and a hard-disk drive with removable media or a removable hard-disk drive 104; other possible forms of high-capacity data storage (not shown) utilizing optical, magneto-optical, or magnetic storage techniques may be included, as appropriate for the particular application. The interface bus standards implemented could include, among others, SCSI-2 or PCMCIA. Data is transmitted to and from these devices under control of microprocessor 110. Currently, data bus 108 would operate as shown as 64-bits wide, employing microprocessors such as those suggested for the computer-disk-based video recorder of FIG. 3; as higher-powered microprocessors become available, such as the PowerPC 620, the data bus may be widened to accommodate 128 bits, and the use of multiple parallel processors may be employed, with the anticipated goal of 1,000 MIPS per processor. Up to 256 MB of ROM 112 is anticipated to support the requisite software, and at least 1,024 MB of RAM 114 will allow for the sophisticated image manipulations, inter-frame interpolation, and intra-frame interpolation necessary for sophisticated production effects, and for conversions between the various image formats.

A key aspect of the system is the versatility of the graphics processor shown generally as 116. Eventually, dedicated hardware will allow the best performance for such operations as image manipulations and re-scaling, but it is not a requirement of the system that it assume these functions. Three separate sections are employed to process the three classifications of signals. Although the video input and output signals described herein below are shown, by example, as RGB, any alternative format for video signals, such as Y/R-Y/B-Y, YIQ, YUV, or other alternatives may be employed as part of the preferred embodiment. One possible physical implementation would be to create a separate circuit board for each of the sections as described below, and manufacture these boards so as to be compatible with existing or future PC-based electrical and physical interconnect standards.

A standard/widescreen video interface 120, intended to operate within the 1024×576 or 1024×768 image sizes, accepts digital RGB signals for processing and produces digital RGB outputs in these formats, as shown generally at 122. Conventional internal circuitry comprising D/A converters and associated analog amplifiers are employed to convert the internal images to a second set of outputs, including analog RGB signals and composite video signals. These outputs may optionally be supplied to either a conventional multi-scan computer video monitor or a conventional video monitor having input provisions for RGB signals (not shown). A third set of outputs supplies analog Y/C video signals. The graphics processor may be configured to accept or output these signals in the standard NTSC, PAL, or SECAM formats, and may additionally be utilized in other formats as employed in medical imaging or other specialized applications, or for any desired format for computer graphics applications. Conversion of these 24 frame-per-second images to the 30 fps (actually, 29.97 fps) NTSC and 25 fps PAL formats may be performed in a similar manner to that used for scanned film materials, that is, to NTSC by using the conventional 3:2 "pull-down" field-sequence, or to PAL by reproducing the images at the higher 25 fps rate. For other HDTV frame rates, aspect ratios, and line rates, intra-frame and inter-frame interpolation and image conversions may be performed by employing comparable techniques well known in the art of computer graphics and television.

An HDTV video interface 124, intended to operate within the 2048×1152 or 2048×1536 image sizes (with re-sizing as necessary), accepts digital RGB (or alternative) signals for processing and produces digital outputs in the same image format, as shown generally at 126. As is the case for the Standard/Widescreen interface 120, conventional internal circuitry comprising D/A converters and associated analog amplifiers are employed to convert the internal images to a second set of outputs, for analog RGB signals and composite video signals.

The third section of the graphics processor 116 shown in FIG. 3 is the film output video interface 128, which comprises a special set of video outputs 130 intended for use with devices such as laser film recorders. These outputs are preferably configured to provide a 4096×2304 or 4096×30.72 image size from the image sizes employed internally, using re-sizing techniques discussed herein as necessary for the format conversions. Although 24 fps is the standard frame rate for film, some productions employ 30 fps (especially when used with NTSC materials) or 25 fps (especially when used with PAL materials), and these alternative frame rates, as well as alternative image sizes and aspect ratios for internal and output formats, are anticipated as suitable applications of the invention, with "3:2-pull-down" utilized to convert the internal 24 fps program materials to 30 fps, and 25 fps occurring automatically as the film projector runs the 24 fps films at the 25 fps rate utilized for PAL-type materials.

Several additional features of this system are disclosed in FIG. 3. The graphics processor includes a special output 132 for use with a color printer. In order to produce the highest quality prints from the screen display it is necessary to adjust the print resolution to match the image resolution, and this is automatically optimized by the graphics processor for the various image sizes produced by the system. In addition, provisions are included for an image scanner 134, which may be implemented as a still image scanner or a film scanner, thereby enabling optical images to be integrated into the system. An optional audio processor 136 includes provisions for accepting audio signals in either analog or digital form, and outputting signals in either analog or digital form, as shown in the area generally designated as 138. For materials including audio intermixed with the video signals as described herein above, these signals are routed to the audio processor for editing effects and to provide an interface to other equipment.

It is important to note that although FIG. 3 shows only one set of each type of signal inputs, the system is capable of handling signals simultaneously from a plurality of sources and in a variety of formats. Depending on the performance level desired and the image sizes and frame rates of the signals, the system may be implemented with multiple hard disk or other mass-storage units and bus controllers, and multiple graphics processors, thereby allowing integration of any combination of live camera signals, prerecorded materials, and scanned images. Improved data compression schemes and advances in hardware speed will allow progressively higher frame rates and image sizes to be manipulated in real-time.

Simple playback of signals to produce PAL output is not a serious problem, since any stored video images may be replayed at any frame rate desired, and filmed material displayed at 25 fps is not objectionable. Indeed, this is the standard method for performing film-to-tape transfers used in PAL- and SECAM-television countries. Simultaneous output of both NTSC and film-rate images may be performed by exploiting the 3:2 field-interleaving approach: 5×24=120=2×60; that is, two film frames are spread over five video fields. This makes it possible to concurrently produce film images at 24 fps and video images at 30 fps. The difference between 30 fps and the exact 29.97 fps rate of NTSC may be palliated by slightly modifying the system frame rate to 23.976 fps. This is not noticeable in normal film projection, and is an acceptable deviation from the normal film rate.

The management of 25 fps (PAL-type) output signals in a system configured for 24 fps production applications (or vice versa) presents technical issues which must be addressed, however. One alternative for facilitating these and other frame-rate conversions is explained with reference to FIG. 4. A digital program signal 404 is provided to a signal compression circuit 408; if the input program signal is provided in analog form 402, then it is first processed by A/D converter 406 to be placed in digital form. The signal compressor 408 processes the input program signal so as to reduce the effective data rate, utilizing any of the commonly implemented data compression schemes, such as motion-JPEG, MPEG-1, MPEG-2, etc. well known in the art. As an alternative, the digital program signal 404 may be provided in data-compressed form. At this point, the digital program signal is provided to data bus 410. By way of example, several high-capacity digital storage units, designated as "storage means A" 412 and "storage means B" 414, are included for storing the digital program signals presented on data bus 410, under management by controller 418. The two storage means 412 and 414 may be used in alternating fashion, with one storing the source signal until it reaches its full capacity. At this point, the other storage means would continue storing the program signal until it, too, reached its full capacity. The maximum program storage capacity for the program signals will be determined by various factors, such as the input program signal frame rate, the frame dimensions in pixels, the data compression rate, the total number and capacities of the various storage means, and so forth. When the available storage capacity has been filled, this data storage scheme automatically will result in previously-recorded signals being overwritten; as additional storage means are added, the capacity for time-delay and frame rate conversion is increased, and there is no requirement that all storage means be of the same type, or of the same capacity. In practice, the storage means would be implemented using any of the commonly available storage techniques, including, for example, magnetic disks, optical or magneto-optical discs, or semiconductor memory.

Figure 4:
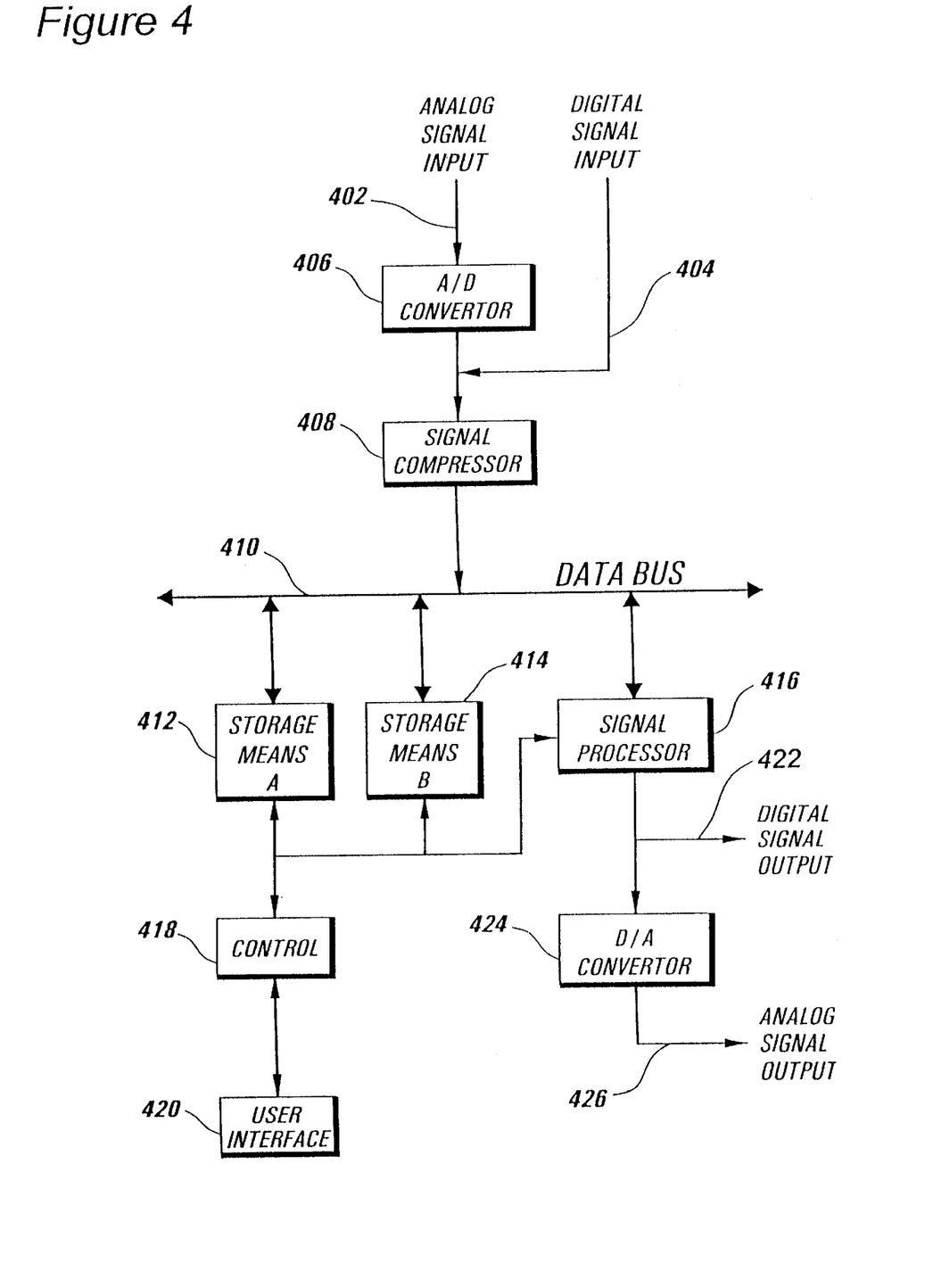
FIG. 4 is a block diagram of an alternative embodiment of video program storage means incorporating asynchronous reading and writing capabilities to carry out frame-rate conversions.

When it is desired to begin playback of the program signal, signal processor 416, under management by controller 418 and through user interface 420, retrieves the stored program signals from the various storage means provided, and performs any signal conversions required. For example, if the input program signals were provided at a 25 fps rate (corresponding to a 625-line broadcast system), the signal processor would perform image resizing and inter-frame interpolation to convert the signal to 30 fps (corresponding to a 525-line broadcast system). Other conversions (such as color encoding system conversion from PAL-format to NTSC, etc., or frame dimension or aspect-ratio conversion) will be performed as necessary. The output of the signal processor is then available in digital form as 422, or may be processed further, into analog form 426 by D/A converter 424. In practice, a separate data bus (not shown) may be provided for output signals, and/or the storage means may be implemented by way of dual-access technology, such as dual-port RAM utilized for video-display applications, or multiple-head-access disk or disc storage units, which may be configured to provide simultaneous random-access read and write capabilities. Where single-head storage means are implemented, suitable input buffer and output buffer provisions are included, to allow time for physical repositioning of the record/play head.

In utilizing program storage means including synchronous recording and reprogram capabilities of the types just described, if it is known that a program will be stored in its entirety before the commencement of playback, that is, with no time-overlap existing between the occurrence of the input and output signal streams, it typically will be most efficient to perform any desired frame conversion on the program either before or after initial storage, depending upon which stored format would result in the least amount of required memory. For example, if the program is input at a rate of 24 frames per second, it probably will be most efficient to receive such a program and store it at that rate, and perform a conversion to higher frame rates upon output. In addition, in situations where a program is recorded in its entirety prior to conversion into a particular output format, it is most efficient to store the program either on a tape-based format or a format such as the new high-capacity DVD discs, given the reduced cost, on a per-bit basis, of these types of storage. Of course, conventional high-capacity disk storage also may be used, and may become more practical as storage capacities continue to increase and costs decrease. If it is known that a program is to be output at a different frame rate while it is being input or stored, it is most preferable to use disk storage and to perform the frame rate conversion on an ongoing basis, using one of the techniques described above. In this case, the high-capacity video storage means, in effect, assumes the role of a large video buffer providing the fastest practical access time. Again, other memory means (types) may be used, including all solid-state and semiconductor types, depending upon economic considerations, and so forth.

As an example of an alternative embodiment, the storage means 100 or 104 of the multi-format audio/video production system would be equipped with dual-head playback facilities and a second set of graphics processing hardware (not shown) analogous in function to the normal graphics processing hardware (identical to the standard hardware shown as 120, 124, and 128), and having analogous signal output facilities (identical to the standard provisions shown as 122, 126, 130, and 132). In this case, the two heads would be driven independently, to provide simultaneous, asynchronous playback at different frame rates; that is, one head would be manipulated so as to provide a data stream corresponding to a first frame rate (for example, 25 fps), while the second head would be manipulated so as to provide a data stream corresponding to a second frame rate (for example, 24 fps, which, in turn, may be converted to 30 fps, using the "3:2-pull-down" technique). Evidently, both the storage means and also the internal bus structure of the system would have to support the significantly increased data rate for providing both signal streams simultaneously, or, as an alternative, a second, separate data bus would be provided.

In some applications, a more sophisticated conversion scheme is required. For example, in frame rate conversion systems of conventional design, if an input program signal having a 24 fps rate format is to be displayed at a 25 fps rate, it is customary to simply speed up the source signal playback, so as to provide the signals at a 25 fps rate. This is the procedure utilized for performing a conversion of 24-fps-film-material for 25 fps PAL-format video usage. However, implementation of this method requires that the user of the output signal must have control over the source-signal playback. In a wide-area distribution system (such as direct-broadcast-satellite distribution) this is not possible. While a source signal distributed at 24 fps readily could be converted to 30 fps (utilizing the familiar "3-2-pull-down" technique), the conversion to 25 fps is not as easily performed, due to the complexity and expense of processing circuitry required for inter-frame interpolation over a 24-frame sequence. However, utilizing the system disclosed in FIG. 4, the conversion is straightforward. If, for example, a 24 fps program lasting 120 minutes is transmitted in this format, there are a total of 172,800 frames of information (24 frames/second×60 seconds/minute×120 minutes); display of this program in speeded-up fashion at 25 fps would mean that the input frame rate falls behind the output frame rate by one frame per second, or a total of 7,200 frames during the course of the program. At a 24 fps transmission rate, this corresponds to 300 seconds transmission time; in other words, for the input program (at 24 fps) and the output program (at 25 fps) to end together, the input process would have to commence 300 seconds before the output process begins. In order to perform this process, then, it is necessary for the storage means to have the capacity to retain 300 seconds of program material, in effect serving as a signal buffer. As an example, for the systems disclosed herein (in which the compressed-data rates range from 8.1 MB/sec (for 24 fps standard/widescreen RGB-based TV formats, using 5:1 data compression such as MPEG or motion-JPEG) to 16.2 MB/sec (for 24 fps HDTV RGB-based formats, using 10:1 data compression such as MPEG or motion-JPEG), it may be necessary to store as much as 4.7 GBytes of data, which is readily available by way of multiple disks or discs utilizing conventional storage technology. In practice, the transmission simply would begin 300 seconds before the playback begins, and once the playback starts, the amount of buffered signal would decrease by one frame per second of playback until the last signal is passed through as soon as it is received.

A mirror of this situation arises in the case of a 25 fps signal to be displayed at 24 fps, or some other data rate readily provided by conversion from 24 fps (such as 30 fps). In this case, the source signal is provided at a higher frame rate than the output signal, so that a viewer watching a program from the onset of the transmission would fall behind the source signal rate, and the storage means would be required to hold frames of the program to be displayed at a time after the source signal arrival time; in the case of the 120 minute program described above, the viewing of the source program would conclude 300 seconds after the source signal itself had concluded, and comparable calculations are applied for the storage means. In this case, the extra frames would be accumulated as the buffer contents increased, until, after the transmission has completed, the last 300 seconds would be replayed directly from the storage means.

The conversion of frame rates from 30 fps to 24 fps or to 25 fps is more complicated, because some form of inter-frame interpolation is required. In one case, a multi-frame storage facility would allow this type of interpolation to be performed in a relatively conventional manner, as typically is utilized in NTSC-to-PAL conversions (30 fps to 25 fps). At this point, a 25 fps to 24 fps conversion could be performed, in accordance with the methods and apparatus described herein above.

It should be noted that if, for example, a DVD-R-type of storage media is selected, then the implementation of the significantly higher data compression rates of MPEG-2 coding techniques will result in the ability to record an entire program of 120 minutes or more in duration. In this manner, the complete program is held in the disc/buffer, thereby enabling the user to perform true time-shifting of the program, or allowing the program rights owner to accomplish one form of software distribution, in accordance with the invention.

An alternative method to carry out this frame rate conversion is to perform, in effect, the reverse of the "3:2 pull-down" procedure. If one were to select every fifth field and delete it from the signal sequence, the resultant ratio of 5:4 of the remaining fields would result in the desired conversion of 30 fps to 24 fps. In this case, it is necessary to re-interlace the image signal, by reversing the field identity (i.e., from odd to even, or from even to odd) of each of the four following fields, so that the signal stream continues to alternate between odd and even fields. The next four fields would be retained, then the fifth field deleted, and the next four again would have their field identity reversed. This pattern would be continued throughout the program. If the original source material were from 24 fps (for example, film), then if the repeated fields (i.e., the "3" field of the 3:2 sequence) were identified at the time of conversion; then the removal of these fields would simply return the material to its original form. If the desired conversion is to be from 30 fps to 25 fps, then an equivalent procedure would be performed using the storage-based frame-conversion method described herein above, or, alternatively, every sixth field could be deleted, in accordance with the method described for 30 fps to 24 fps. Depending on the original source material frame rate and intermediate conversions, the user would select the method likely to present the least amount of image impairment.

In the case in which the user is able to exercise control over the frame rate of the source program material, an alternative method is available. Just as film-to-video transfers for PAL-format (25 fps) presentations utilize a speeded-up playback of the 24 fps film materials to source them at the 25 fps rate (thereby matching the intended output frame rate), the reverse of this process enables a user to utilize materials originated at 25 fps to produce playback at 24 fps. As disclosed herein above, conversions of 24 fps materials are handled easily in conventional methods (such as the "3:2-pull-down" method), and therefore the operator control of the source material enables the user to utilize materials originating from conventional or widescreen PAL format sources for editing and production, then replaying the resulting program at 24 fps for conversion to either standard or widescreen NTSC output materials, or even to HDTV format materials, all at 30 fps, by performing the "3:2-pull-down" process.

In these applications, the presence of the storage means allows the viewer to control the presentation of a program, utilizing a user interface 420 to control the playback delay and other characteristics of the signal while it is being stored or thereafter. In practice, a wide range of alternatives for input frame rates and output frame rate conversions are made available through this system, by selecting the most appropriate of the various methods for altering the frame rate of a signal described herein.

Figure 5:
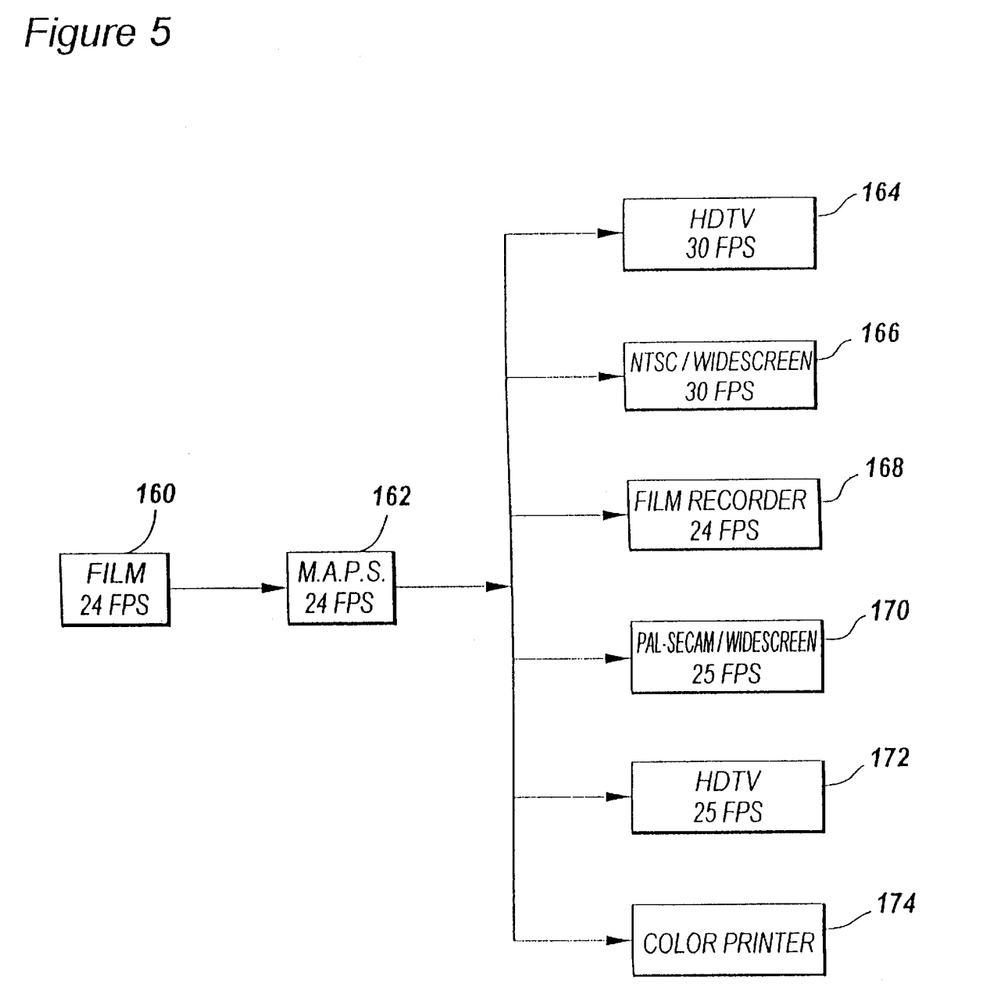
FIG. 5 shows the inter-relationship of the multi-format audio/video production system to many of the various existing and planned video formats.

FIG. 5 shows the inter-relationship of the various film and video formats compatible with the invention, though not intended to be inclusive of all possible implementations. In-typical operations, the multi-format audio/video production system 162 would receive film-based elements 160 and combine them with locally produced materials already in the preferred internal format of 24 frames-per-second. In practice, materials may be converted from any other format including video at any frame rate or standard. After the production effects have been performed, the output signals may be configured for any use required, including, but not limited to, HDTV at 30 fps shown as 164, NTSC/widescreen at 30 fps shown as 166, PAL-SECAM/widescreen at 25 fps shown as 170, or HDTV at 25 fps shown as 172. In addition, output signals at 24 fps are available for use in a film-recording unit 168.

Figure 6:
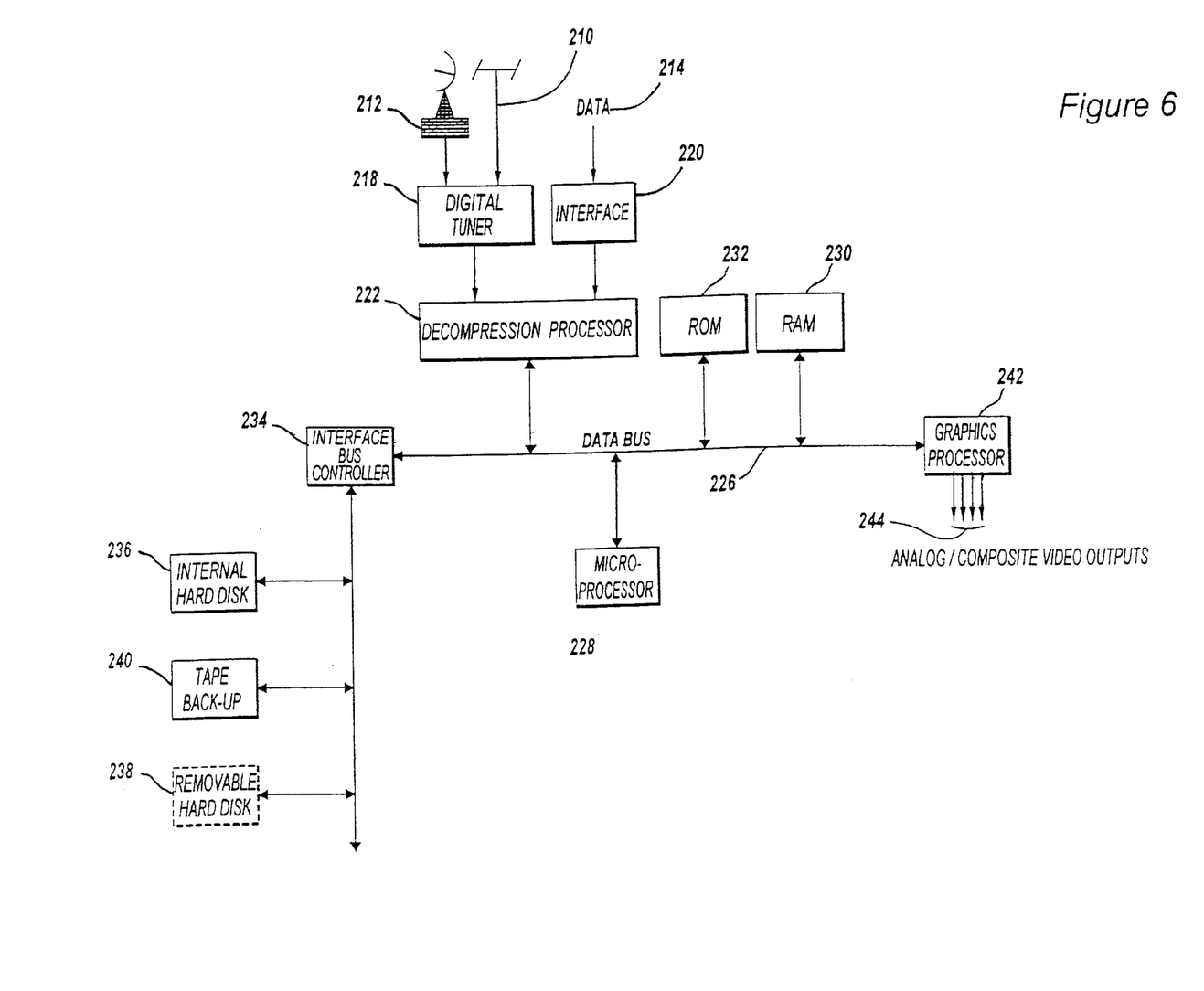
FIG. 6 shows the implementation of a complete television production system, including signals provided by broadcast sources, satellite receivers, and data-network interfaces.

FIG. 6 shows an implementation involving one possible choice for image sizes, aspect ratios, and frame rates to provide a universal television production system. As shown, signals are provided from any of several sources, including conventional broadcast signals 210, satellite receivers 212, and interfaces to a high bandwidth data network 214. These signals would be provided to the digital tuner 218 and an appropriate adapter unit 220 for the data network or "information superhighway" before being supplied to the decompression processor 222. The processor 222 provides any necessary data de-compression and signal conditioning for the various signal sources, and preferably is implemented as a plug-in circuit board for a general-purpose computer, though the digital tuner 218 and the adapter 220 optionally may be included as part of the existing hardware.

The output of processor 222 is provided to the internal data bus 226. The system microprocessor 228 controls the data bus, and is provided with 16 to 64 MB of RAM 230 and up to 64 Mb of ROM 232. This microprocessor could be implemented using one of the units previously described, such as the PowerPC 604 or PowerPC 620. A hard disk drive controller 234 provides access to various storage means, including, for example, an internal hard disk drive unit 236, a removable hard disk drive unit 238, or a tape drive 240; these storage units also enable the PC to function as a video recorder, as described above. A graphic processor 242, comprising dedicated hardware which optionally be implemented as a separate plug-in circuit board, performs the image manipulations required to convert between the various frame sizes (in pixels), aspect ratios, and frame rates. This graphics processor uses 16 to 32 MB of DRAM, and 2 to 8 MB of VRAM, depending on the type of display output desired. For frame size of 1280×720 with an aspect ratio 16:9, the lower range of DRAM and VRAM will be sufficient, but for a frame size of 2048×1152, the higher range of DRAM and VRAM is required. In general, the 1280×720 size is sufficient for conventional "multi-sync" computer display screens up to 20 inches, and the 2048× 1152 size is appropriate for conventional "multi-sync" computer display screens up to 35 inches. Analog video outputs 244 are available for these various display units. Using this system, various formats may be displayed, including (for 25 fps, shown by speeding up 24 fps signals) 768×576 PAL/SECAM, 1024×576 wide-screen, and 2048×1152 HDTV, and (for 30 fps, shown by utilizing the well-known "3:2 pull-down" technique, and for 29.97 fps, shown by a slight slow-down in 30 fps signals) 640×480 NTSC and 854×480 wide-screen, and 1280×720 USA and 1920×1080 NHK (Japan) HDTV. While most NTSC monitors will synchronize to a 30 fps signal, possibly requiring that the color subcarrier frequency be adjusted, many PAL and SECAM monitors will not accept a 24 fps signal. In this case, more sophisticated frame-rate conversion techniques, such as those described herein above, may be required for viewing live broadcasts, since the 24 fps input signal rate cannot keep pace with the 25 fps display rate. However, in practice it is anticipated that future television sets will incorporate "multi-sync" designs that eliminate this potential problem.

Figure 7:
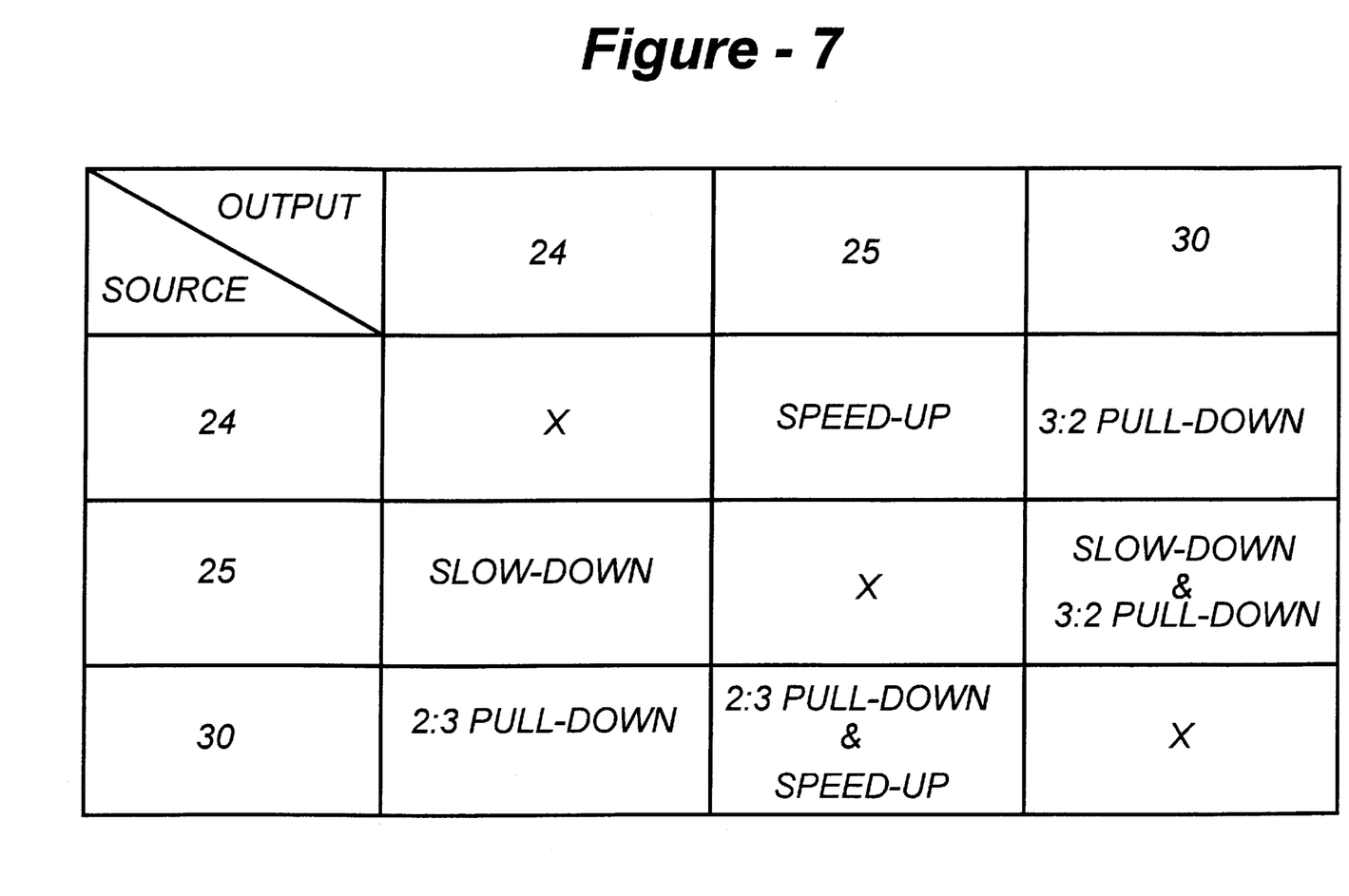
FIG. 7 shows the preferred methods for conversion between several of the most common frame-rate choices.

It will be appreciated by the skilled practitioner of the art that most of the highest quality program material has been originated on 24 fps 35-mm film, and therefore conversions that rely on reconstituting the signal material from 25 fps or 30 fps materials into 24 fps material do not entail any loss of data or program material. In addition, signals that have been interlaced from a lower or equivalent frame rate source signal in any of the currently available means (24 fps to 25 fps via speed-up; 24 fps to 30 fps via "3:2-pull-down") may be de-interlaced and reconstituted as progressive-scan frames without introducing any signal artifacts, provided that the original frames are recreated from properly matched fields. These techniques are summarized in FIG. 7.

Figure 8:
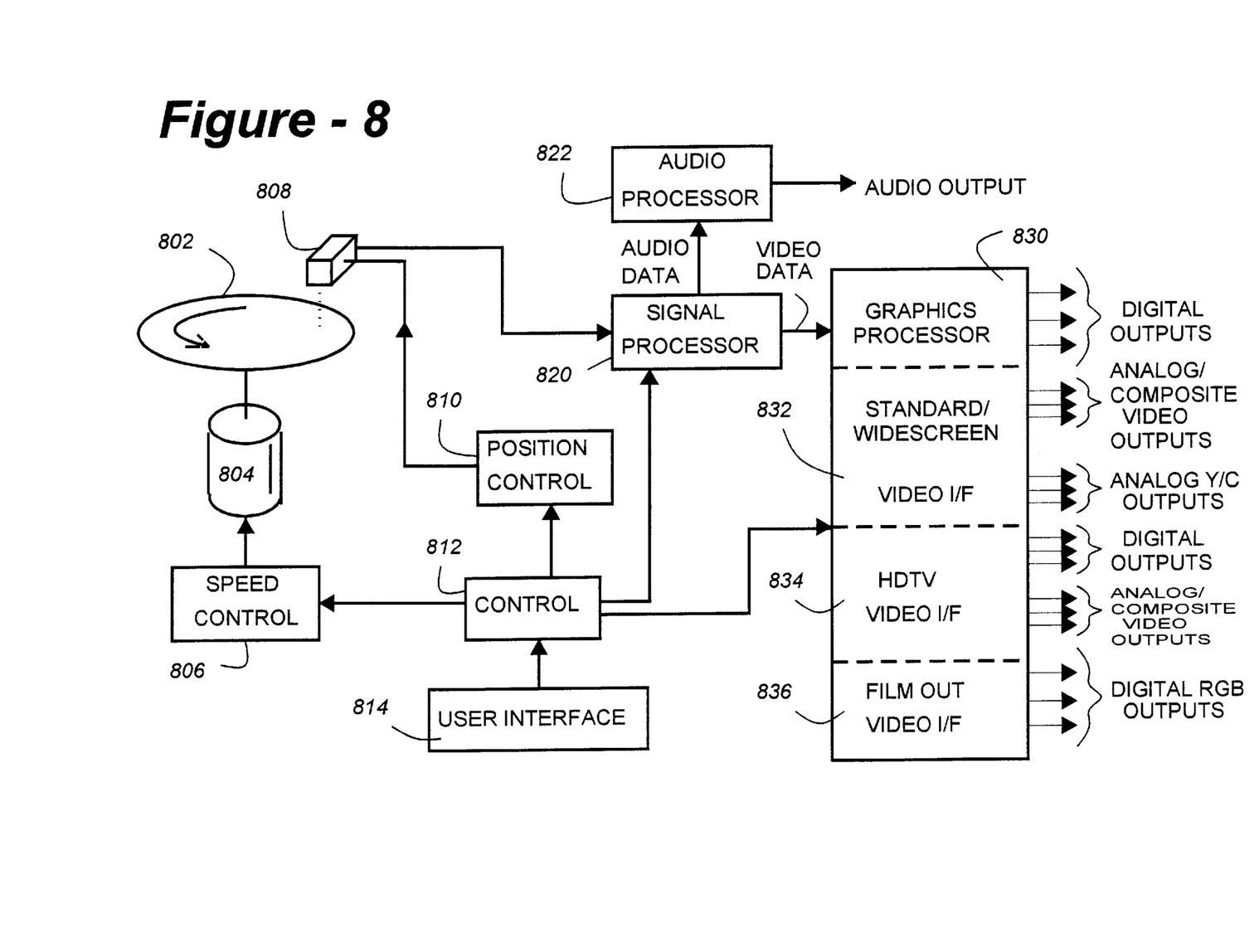
FIG. 8 shows a block diagram of an embodiment of a universal playback device for multi-format use.

FIG. 8 shows one possible implementation of a universal playback device, in accordance with the invention. By way of example, a DVD-type video disc 802 is rotatably driven by motor 804 under control of speed-control unit 806. One or more laser read- or read/write-heads 808 are positioned by position control unit 810. Both the speed control unit and the position control unit are directed by the overall system controller 812, at the direction of the user interface 814. It should be noted that the number and configuration of read-or read/write-heads will be determined by the choice of the techniques employed in the various embodiments disclosed herein above. The signals recovered from the laser heads is delivered to signal processor unit 820, and the data stream is split into an audio data stream (supplied to audio processor unit 822) and a video data stream (supplied to video graphics processor unit 830).

During the audio recovery process, the alteration of the playback frame rate (for example, from 24 fps to 25 fps, accomplished by speed control adjustment) may suggest the need for pitch-correction of the audio material. This procedure, if desired, may be implemented either as part of the audio processor 822, or within a separate, external unit (not shown), as offered by a number of suppliers, such as Lexicon.

The video data stream may undergo a number of modifications within the graphics processor, shown generally at 830, depending on the desired final output format. Assuming that the output desired is NTSC or some other form of wide-screen or HDTV signal output at a nominal frame rate of 30 fps, a signal sourced from the disc at 24 fps would undergo a "3:2-pull-down" modification as part of the conversion process (as explained herein above); if the signal as sourced from the disk is based on 25 fps, then it would undergo an preliminary slowdown to 24 fps before the "3:2-pull-down" processing is applied. It should be noted that the 0.1% difference between 30 fps and 29.97 fps only requires the buffering of 173 frames of video over the course of a 120-minute program, and at a data rate of 8.1 MB/sec, this corresponds to approximately 57 MB of storage (for Standard/widescreen) or 115 MB of storage (for HDTV), which readily may-be implemented in semiconductor-based memory. In any event, a signal supplied to the graphics processor at a nominal 24 fps simultaneously may be output at both 30 fps and 29.97 fps, in image frames compatible with both NTSC and NTSC/widescreen (the Standard/Widescreen Video Interface 832), and HDTV (HDTV Video Interface 834), in accordance with the invention as described herein above. As disclosed above, an optional Film Output Video Interface 836 may be included, with digital video outputs for a film recorder. Overall, the outputs for the Graphics processor 830 parallel those of the Multi-Format Audio/Video Production System as shown in FIG. 5 and disclosed herein above. In addition, for signals to be output in a format having a different aspect ratio than that of-the source signal, it may be necessary to perform a "pan/scan" function in order to assure that the center of action in the source program material is presented within the scope of the output frame. This function may be implemented within the graphics processor by utilizing a "tracking" signal associated with the source program material, for example, as part of the data stream for each frame, or, alternatively, through a listing identifying changes that should be applied during the presentation of the source material. Where no "tracking" information is available, the image frame would be trimmed along the top and bottom, or the sides, as necessary in order to fit the aspect ratio of the source material to the aspect ratio of the output frame. This latter technique is explained herein above, with reference to FIGS. 1A–1D. In addition, the program material may include security information, such as regional or geographical information directed towards controlling the viewing of the program material within certain marketing areas or identifiable classes of equipment (such as hardware sold only in the United States or in the German market). This information, as has been disclosed for use with other disc- and tape-based systems, often relates to issues such as legal licensing agreements for software materials; it may be processed in a way similar to the detection and application of the "pan/scan" tracking signal, and the signal processor 820, under the direction of controller 812 may act to enforce these restrictions.

Alternatively, if output at 25 fps is desired, it is a simple matter to configure the various components of this system to replay the video information of the disc 802 at this higher frame rate. The controller will configure the speed control unit 806 (if necessary) to drive the motor 804 at a greater rotational speed to sustain the increased data rate associated with the higher frame rate. The audio processor 822, if so equipped, will be configured to correct for the change in pitch associated with the higher frame rate, and the Graphics processor will be configured to provide all output signals at the 25 fps frame rate.

As yet another alternative, materials produced at 25 fps and stored on the disc-based mass storage means of this example could originate from conventional standard or widescreen PAL format signals. Utilizing the slow-down method, these signals are readily converted to 24 fps frame rate, from which conversion to various 30 fps formats is implemented, as disclosed herein above. This feature has significance in the commercial development of HDTV, as the ability to utilize more-or-less conventional PAL format equipment greatly facilitates the economical production and origination of materials intended for HDTV markets.

It will be appreciated that a wide range of output frame rates may be made available through combination of the techniques of speed-up, slow-down, "3-2-pull-down," and other related field-rearrangement techniques as disclosed herein above with respect to FIG. 4, and these various combinations and approaches should be considered to be within the scope of the invention. In addition, these techniques may be combined with hardware and/or software which perform image manipulations such as line-doubling, deinterlacing, etc., such that the display device will be capable of providing smoother apparent motion, by increasing the display rate without increasing the actual data/information rate. One example would be to process the 24 fps signal from the internal format to convert it into a 48 fps signal, using field-doubling techniques such as deinterlacing and line doubling; then, the process would employ framestore techniques to provide a frame-doubled output at a rate of 96 fps. These types of display-related improvements, in conjunction with the instant invention, should also be considered to be within the scope of the invention as disclosed herein.

Having described the invention, I claim:

1. A multi-format audio/video production system adapted for use with a display device, comprising:
    an input to receive a signal representative of an audio/video program in one of a plurality of display formats;
    high-capacity video storage means including an asynchronous program recording and reproducing capability;
    an operator control; and
    a graphics processor in communication with the input, the high-capacity video storage means, and the operator control, enabling a user to perform the following functions:
    (a) convert the display format of the audio/video program received through the input into an intermediate production format,
    (b) perform a frame-rate conversion of the audio/video program received through the input means using the asynchronous recording and reproducing capability associated with the high-capacity video storage means, and
    (c) output a program having a display format or frame rate different than that of the audio/video program received through the input.

2. The multi-format audio/video production system of claim 1, wherein the graphics processor is operative to output a program in a standard television format regardless of the display format of the input program.

3. The multi-format audio/video production system of claim 1, wherein the graphics processor is operative to output a program in a widescreen format regardless of the display format of the input program.

4. The multi-format audio/video production system of claim 1, wherein the graphics processor is operative to output a program in an enhanced-definition format regardless of the display format of the input program.

5. The multi-format audio/video production system of claim 4, wherein the enhanced-definition format is an HDTV format.

6. The multi-format audio/video production system of claim 1, wherein the graphics processor is operative to output a program in a film-compatible format regardless of the display format of the input program.

7. The multi-format audio/video production system of claim 1, wherein the graphics processor is further operative to perform a pan/scan operation with respect to the program received through the input.

8. The multi-format audio/video production system of claim 1, wherein the graphics processor is further operative to perform an interpolation operation with respect to the program received through the input so as to expand the number of pixels associated with the production format as compared to the input display format.

9. The multi-format audio/video production system of claim 1, wherein the graphics processor is further operative to perform an interpolation operation with respect to the program received through the input so as to reduce the number of pixels associated with the production format as compared to the input display format.

10. The multi-format audio/video production system of claim 1, wherein the high-capacity video storage means includes sufficient capacity to store at least 120 minutes of program material to perform the frame-rate conversion.

11. The multi-format audio/video production system of claim 1, including high-capacity video storage means in the form of a removable medium.

12. The multi-format audio/video production system of claim 1, further including means for performing a data compression operation on a program prior to storing the program in the high-capacity video storage means.

13. The multi-format audio/video system of claim 1, wherein the intermediate production format is based upon a frame rate of 24 frames per second.

14. A multi-format audio/video production system forming part of a general-purpose computer platform having a user input and a color display, the system comprising:

means to receive an input video program in one of a plurality of input formats;

high-capacity video storage means;

means to convert the input program into a 24 frames-per-second (fps) production format, if necessary, for storage within the high-capacity video storage means and for review on the color display;

means to convert the production format into one or more of the following output formats, either directly from the input receiving means or from the storage means:
NTSC at 30 fps,
PAL/SECAM at 25 fps,
HDTV at 25 fps,
HDTV at 30 fps,
film-compatible video at 24 fps, and
film-compatible video at 30 fps; and asynchronous program recording and reproducing capabilities to provide a program in an output format having a frame rate greater than 24 per second.

15. The multi-format audio/video production system of claim 14, wherein the means to convert the production format into one or more of the output formats further includes interpolation means to expand the number of pixels associated with the production format.

16. The multi-format audio/video production system of claim 14, wherein the asynchronous program recording and reproducing capabilities are used to increase the frame rate from the 24 fps production format frame rate to a 25 fps output frame rate.

17. The method of claim 16, wherein the step of manipulating the video program in the production format further includes the step of performing an interpolation operation on a received so as to expand the number of pixels associated with the production format as compared to the input format.

18. The method of claim 16, wherein the step of manipulating the video program in the production format further includes the step of performing an interpolation operation on a received so as to reduce the number of pixels associated with the production format as compared to the input format.

19. The method of claim 16, wherein the step of manipulating the video program in the production format includes the step of panning and scanning the vision center of the displayed program.

20. The method of claim 16, wherein the step of manipulating the video program in the production format includes the step of providing predetermined criteria used to restrict the viewing of the program.

21. In an enhanced personal computer having a color monitor, the method of producing a video program, comprising the steps of:

receiving an input video program;

converting the input video program into a production format having a predetermined frame rate and image dimension in pixels;

providing a high-capacity video storage means equipped with an asynchronous program recording and reproducing capability to perform a frame-rate conversion;

manipulating the video program in the production format using the high-capacity video storage means on a selective basis to output an edited version of the program having a desired frame rate and image dimensions in pixels which may be different from those of the production format.

22. The method of claim 21, further including the step of interpolating the video program in the production format to output an edited version of the program having pixel dimensions greater than that of the production format.

23. The method of claim 21, further including the step of controlling pan/scan operations relative to the received input video program.

24. The method of claim 21, wherein the high-capacity video storage means includes sufficient capacity to store at least 120 minutes of program material.

25. The method of claim 21, further including the step of providing a removable high-capacity video storage medium.

26. The method of claim 21, further including the step of data compressing the video program in the production format.

27. The method of claim 21, wherein the predetermined frame rate is 24 frames per second.

* * * * *